(12) United States Patent
Chen et al.

(10) Patent No.: US 10,591,699 B2
(45) Date of Patent: Mar. 17, 2020

(54) IMAGE FOCUSING METHOD, AND IMAGE CAPTURE DEVICE AND ELECTRONIC DEVICE APPLYING THE SAME

(71) Applicant: Primax Electronics Ltd., Taipei (TW)

(72) Inventors: Ying-Shou Chen, Taipei (TW); Shu-Ying Chen, Taipei (TW)

(73) Assignee: Primax Electronics Ltd., Taipei (TW)

(\*) Notice: Subject to any disclaimer, the term of this patent is extended or adjusted under 35 U.S.C. 154(b) by 135 days.

(21) Appl. No.: 15/833,768

(22) Filed: Dec. 6, 2017

(65) Prior Publication Data

US 2019/0086632 A1 Mar. 21, 2019

(30) Foreign Application Priority Data

Sep. 15, 2017 (TW) .............................. 106131806 A

(51) Int. Cl.
| | | |
|---|---|---|
| *G02B 7/10* | (2006.01) | |
| *G03B 3/10* | (2006.01) | |
| *G02B 27/64* | (2006.01) | |
| *G02B 7/09* | (2006.01) | |
| *G02B 13/00* | (2006.01) | |
| *G03B 13/36* | (2006.01) | |
| *G02B 7/08* | (2006.01) | |

(52) U.S. Cl.
CPC ............... *G02B 7/102* (2013.01); *G02B 7/09* (2013.01); *G02B 13/001* (2013.01); *G02B 27/646* (2013.01); *G03B 3/10* (2013.01); *G03B 13/36* (2013.01); *G02B 7/08* (2013.01); *G03B 2205/0023* (2013.01); *G03B 2205/0069* (2013.01)

(58) Field of Classification Search
CPC . G02B 7/102; G02B 7/09; G02B 7/08; G02B 13/001; G02B 27/646; G03B 3/10; G03B 2205/0069
USPC .......................................................... 359/557
See application file for complete search history.

(56) References Cited

U.S. PATENT DOCUMENTS

| | | | | |
|---|---|---|---|---|
| 9,426,348 | B2* | 8/2016 | Tada ................... | H04N 5/23212 |
| 9,678,357 | B2* | 6/2017 | Takeuchi ............. | G02B 27/646 |
| 10,051,174 | B2* | 8/2018 | Miyazawa ............... | G02B 7/34 |
| 10,451,705 | B2* | 10/2019 | Irie ..................... | H04N 5/23296 |
| 10,473,883 | B2* | 11/2019 | Shimotsu ............... | G02B 7/282 |
| 2011/0122495 | A1* | 5/2011 | Togashi ................. | G02B 7/023 359/557 |
| 2014/0055630 | A1* | 2/2014 | Gregory ................... | G03B 3/02 348/208.2 |
| 2015/0153584 | A1* | 6/2015 | Yasuda .................. | G02B 7/023 359/557 |

(Continued)

*Primary Examiner* — Collin X Beatty
(74) *Attorney, Agent, or Firm* — Muncy, Geissler, Olds & Lowe, P.C.

(57) ABSTRACT

The present invention provides an image focusing method that is applied to an image capture device having an optical image stabilization (OIS) function, including: driving the at least one optical lens to tilt by an angle in response to a first selected target and a second selected target, and enabling a first light beam group from the first selected target and a second light beam group from the second selected target to be focused on a same imaging surface after passing through the at least one optical lens. In addition, the present invention further provides an image capture device and an electronic device that apply the foregoing method.

13 Claims, 4 Drawing Sheets

(56) References Cited

U.S. PATENT DOCUMENTS

| | | | |
|---|---|---|---|
| 2015/0160426 A1* | 6/2015 | Chao | G02B 7/08 |
| | | | 359/824 |
| 2017/0280060 A1* | 9/2017 | Sugita | G02B 7/14 |
| 2017/0285363 A1* | 10/2017 | Hu | G02B 7/09 |
| 2018/0041709 A1* | 2/2018 | Konttori | H04N 5/2257 |
| 2018/0131874 A1* | 5/2018 | Tamura | G02B 13/04 |
| 2018/0149833 A1* | 5/2018 | Lee | G02B 9/60 |
| 2018/0188474 A1* | 7/2018 | Enta | G02B 7/08 |
| 2018/0217475 A1* | 8/2018 | Goldenberg | G03B 3/10 |
| 2018/0295286 A1* | 10/2018 | Maede | G02B 27/646 |
| 2018/0329170 A1* | 11/2018 | Huang | G02B 7/09 |
| 2019/0056565 A1* | 2/2019 | Yang | G02B 13/002 |
| 2019/0158749 A1* | 5/2019 | Kunick | G02B 7/08 |

* cited by examiner

IMAGE FOCUSING METHOD, AND IMAGE CAPTURE DEVICE AND ELECTRONIC DEVICE APPLYING THE SAME

FIELD OF THE INVENTION

The present invention relates to the field of imaging optics, and in particular, to an image focusing method, and an image capture device and an electronic device applying the method.

BACKGROUND OF THE INVENTION

In recent years, with evolution of the electronic industry and rapid development of the industrial technology, various electronic devices are designed and developed toward a direction of being portable and easy for carrying, so as to be applied by a user for commercial affairs, entertainments, or leisure at anytime and anywhere. For example, various image capture devices are widely applied to various fields. For example, an electronic device such as a smartphone, a wearable electronic device, or an aerial photographic device has advantages of being small in volume and convenient for carrying. Therefore, the user is enabled to take out the electronic device anytime when the user needs to use and capture and save an image, or further to upload the image to the Internet by using the network; this does not merely have an important commercial value but further makes people's daily life colorful. However, with improvement of the quality of life, people have more demands on images, and especially hope that an obtained image has higher imaging quality or more imaging effects.

For example, to highlight a target in the image, people hope that areas other than the target in the image are fuzzier than the target, that is, a background blurring function. In detail, referring to FIG. 1, FIG. 1 is a conceptual schematic diagram of an optical path of an existing image capture device provided with a background blurring function. An image capture device 1 includes an optical lens 11 and an image sensing element 12. The optical lens 11 is located between a target A1 of a shot scene and an imaging surface 121 of the image sensing element 12. Moreover, an optic axis 19 of the optical lens 11 is vertical to the imaging surface 121 of the image sensing element 12. In a process that the image capture device 1 shoots an image, the image capture device 1 may perform focusing after the target A1 is selected, so that a light beam group L11 from the target A1 may be focused to the imaging surface 121 of the image sensing element 12 after passing through the optical lens 11. Further, the image capture device 1 may obtain a clear image of the target A1. However, a light beam group L12 from another target (for example, another target B1 at a position different from that of the target) would not be focused to the imaging surface 121 of the image sensing element 12 after passing through the optical lens 11. Therefore, in the image obtained by the image capture device 1, other image areas other than the target A1 are relatively fuzzy, so as to present a background blurring effect.

However, the prior art can merely provide a single-point focusing background blurring function. That is, an image shot by the image capture device cannot have the effect of enabling a plurality of targets clear but other image areas fuzzy. Therefore, requirements of the user who hopes to highlight a plurality of selected targets in the image cannot be satisfied. Therefore, the conventional image focusing method may be improved.

SUMMARY OF THE INVENTION

An objective of the present invention is to provide an image focusing method, and in particular, relates to an image focusing method that enables an image to have a background blurring effect of multipoint focusing by using a tilt lens.

Another objective of the present invention is to provide an image capture device and an electronic device that apply the foregoing image focusing method.

In a preferred embodiment, the present invention provides an image focusing method that is applied to an image capture device having an optical image stabilization (OIS) function, where when the image capture device is provided with the OIS function, at least one optical lens of the image capture device is driven to tilt, and the image focusing method includes:

driving the at least one optical lens to tilt by an angle in response to a first selected target and a second selected target, and enabling a first light beam group from the first selected target and a second light beam group from the second selected target to be focused on a same imaging surface after passing through the at least one optical lens.

In a preferred embodiment, the present invention also provides an image capture device, including:

a motion sensing element;

at least one optical lens;

an image sensing element, including an imaging surface; and a driving element, configured to drive, according to a sense result of the motion sensing element, the at least one optical lens to tilt, so as to provide an OIS function; and configured to drive the at least one optical lens to tilt by an angle in response to a first selected target and a second selected target, and enable both a first light beam group from the first selected target and a second light beam group from the second selected target to be focused on the imaging surface after passing through the at least one optical lens.

In a preferred embodiment, the present invention also provides an electronic device, including:

housing; and an image capture device, disposed in the housing, and including:

a motion sensing element;

at least one optical lens;

an image sensing element, including an imaging surface; and a driving element, configured to drive, according to a sense result of the motion sensing element, the at least one optical lens to tilt, so as to provide an OIS function; and configured to drive the at least one optical lens to tilt by an angle in response to a first selected target and a second selected target, and enable both a first light beam group from the first selected target and a second light beam group from the second selected target to be focused on the imaging surface after passing through the at least one optical lens.

DETAILED DESCRIPTION OF THE PREFERRED EMBODIMENT

Figure 1:
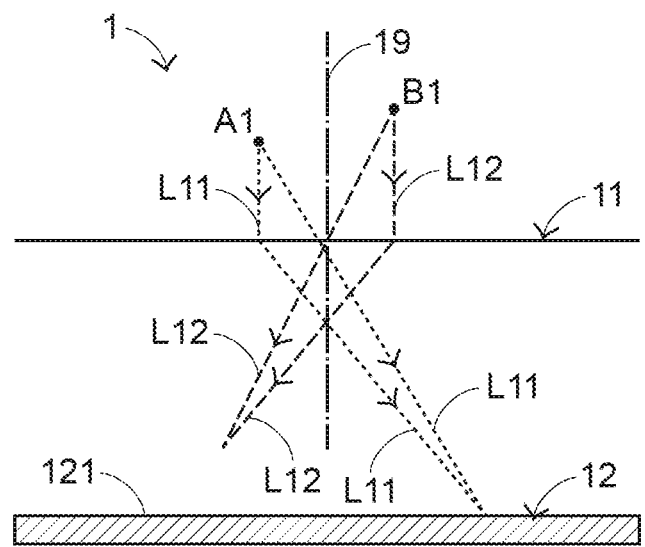
FIG. 1 is a conceptual schematic diagram of an optical path of an existing image capture device provided with a background blurring function.
Figure 2:
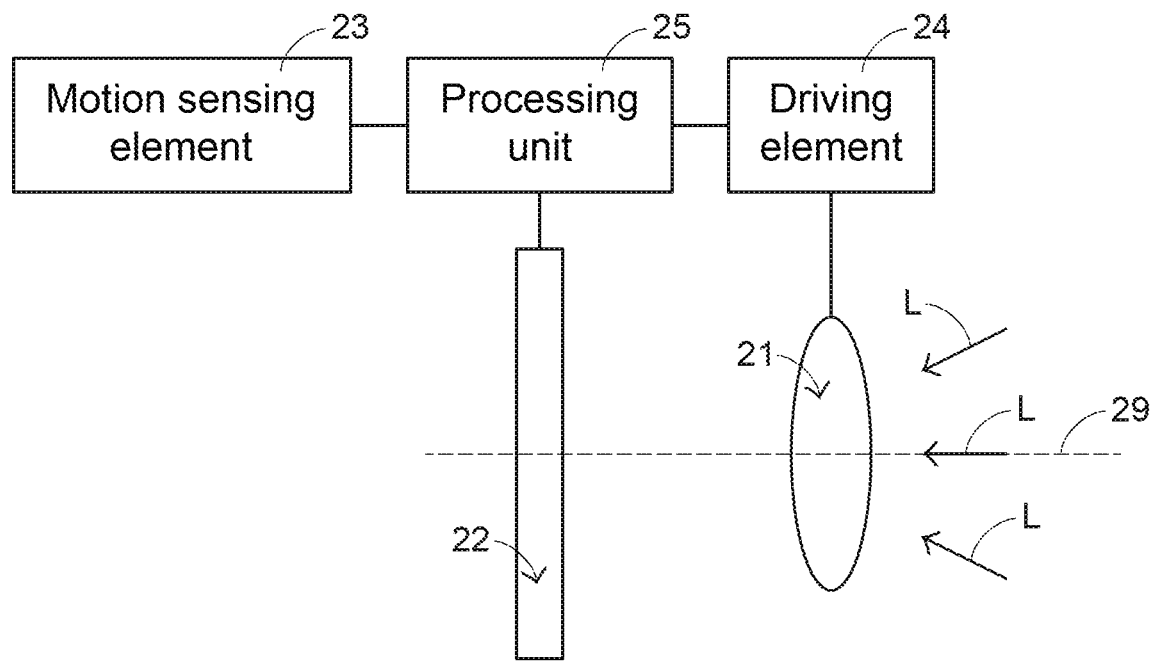
FIG. 2 is a conceptual schematic diagram in a preferred embodiment of an image capture device according to the present invention.

An image capture device according to the present invention is first described. Referring to FIG. 2, FIG. 2 is a conceptual schematic diagram in a preferred embodiment of an image capture device according to the present invention. An image capture device 2 includes an optical camera 21, an image sensing element 22, a motion sensing element 23, a driving element 24, and a processing unit 25. The optical camera 21 includes at least an optical lens 211 (see FIG. 3 for details). The processing unit 25 may be hardware, software, or firmware, and is connected to the image sensing element 22, the motion sensing element 23, and the driving element 24. The image sensing element 22 is configured to sense a light beam L that passes through the optical lens 211 and is incident to the image sensing element 22, so as to obtain an image. The driving element 24 is connected to the optical camera 21, and is configured to drive the optical lens 211 tilt; this is described in detail later. In this preferred embodiment, the driving element 24 is a voice coil motor, and the image sensing element 22 is a charge-coupled device (CCD) or a complementary metal-oxide-semiconductor (CMOS) device, but the two are not limited thereto.

Figure 3:
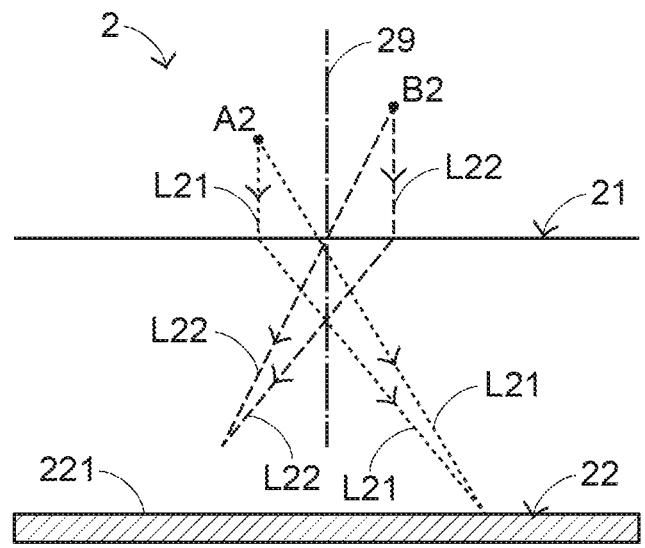
FIG. 3 is a conceptual schematic diagram of an optical path that the image capture device shown in FIG. 2 is in a state.

Referring to FIG. 3, FIG. 3 is a conceptual schematic diagram of an optical path that the image capture device shown in FIG. 2 is in a state. The optical lens 211 is located between a target of a shot scene and an imaging surface 221 of the image sensing element 22. Moreover, an optic axis 29 of the optical lens 211 is vertical to the imaging surface 221 of the image sensing element 22. A first light beam group L21 from a first target A2 is focused to the imaging surface 221 of the image sensing element 22 after passing through the optical lens 211, and a second light beam group L22 from a second target B2 is not focused to the imaging surface 221 of the image sensing element 22 after passing through the optical lens 211. In such a state, an image shot by the image capture device 2 may have a case in which the first target A2 is clear but the second target B2 and other image areas are fuzzy.

Figure 4:
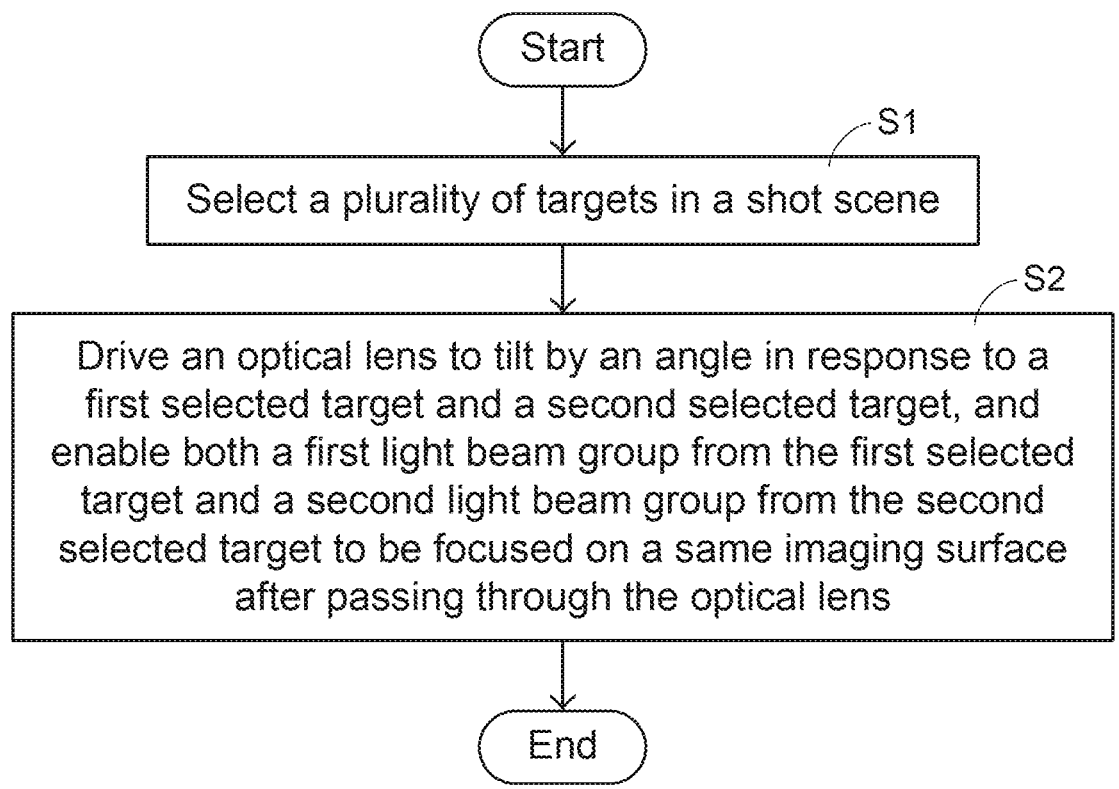
FIG. 4 is a preferred method flowchart of an image focusing method according to the present invention.
Figure 5:
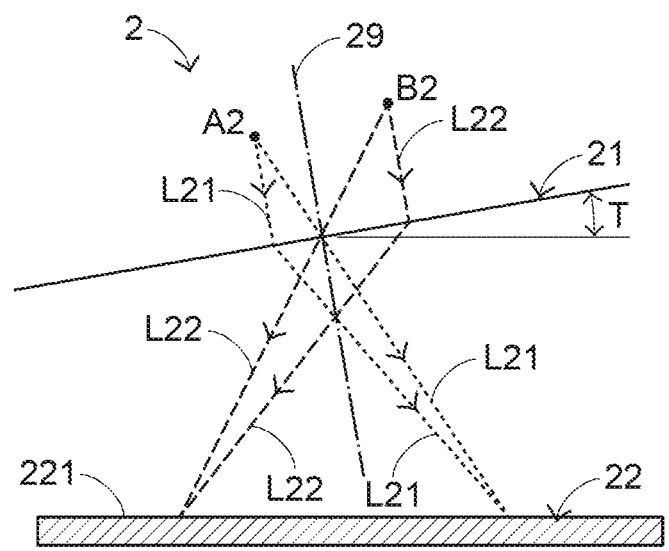
FIG. 5 is a conceptual schematic diagram of an optical path after an optical lens is actuated by using the method shown in FIG. 3.

To enable the second target B2 in the image shot by the image capture device 2 to still be clearly presented, how the image capture device 2 in this application performs image focusing is described in the following. Referring to FIG. 4 and FIG. 5, FIG. 4 is a preferred method flowchart of an image focusing method according to the present invention; and FIG. 5 is a conceptual schematic diagram of an optical path after an optical lens is actuated by using the method shown in FIG. 3. The image focusing method includes step S1 and step S2, and the step S1 and the step S2 are separately described in detail in the following.

Step S1: Select a plurality of targets in a shot scene. In a process of selecting the targets, a user may select the targets by viewing a display screen (shown in the figure) that is in the image capture device 2 and that is for displaying the shot scene and by further clicking the targets to be highlighted; however, this is not limited to the foregoing selection manner in actual applications. In addition, although merely two selected targets, that is, a first selected target A2 and a second selected target B2, are shown in FIG. 5, it is not limited to the this quantity in actual applications.

Step S2: An optical lens 211 is driven by a driving element 24 to tilt by an angle T in response to a first selected target A2 and a second selected target B2, and at this time, an optic axis 29 of the optical lens 211 also tilts, and both a first light beam group L21 from the first selected target A2 and a second light beam group L22 from the second selected target B2 are focused to an imaging surface 221 of an image sensing element 22 after passing through the optical lens 211, as shown in FIG. 5. In this way, the image shot by the image capture device 2 may have a multipoint focusing and background blurring effect, that is, an effect that the plurality of selected targets A2 and B2 are all clear but the other image areas are fuzzy.

In this preferred embodiment, after the targets are selected, the processing unit 25 calculates, according to the selected targets (that is, the first selected target A2 and the second selected target B2), the angle T by which the optical lens 211 needs to tilt; and then the driving element 24 drives, according to a calculation result of the processing unit 25, the optical lens 211 to tilt by the required angle T, however, calculation and driving procedures are not limited thereto.

In addition, most of the existing image capture devices 2 are provided with an optical image stabilization (OIS) function. That is, the driving element 24 may drive, according to a sense result of the motion sensing element 23, the optical lens 211 to tilt, so as to keep the optic axis 29 be vertical to the image sensing element 22, thereby avoiding that a fuzzy image is shot. However, it should be particularly noted that if the image focusing method is this application is applied to an image capture device 2 that originally has the OIS function, the driving element 24 that is originally provided in the image capture device 2 may be directly used in step S2 to drive the optical lens 211 to tilt, so as to enable a plurality of light beam groups that are respectively from the plurality of selected targets to be focused to an angle of the imaging surface 221 of the image sensing element 22 after passing through the optical lens 211. Therefore, the image capture device 2 that originally has the OIS function may be provided with a multipoint focusing and background blurring function without being provided with an additional driving element 24, so that the costs are not added.

Figure 6:
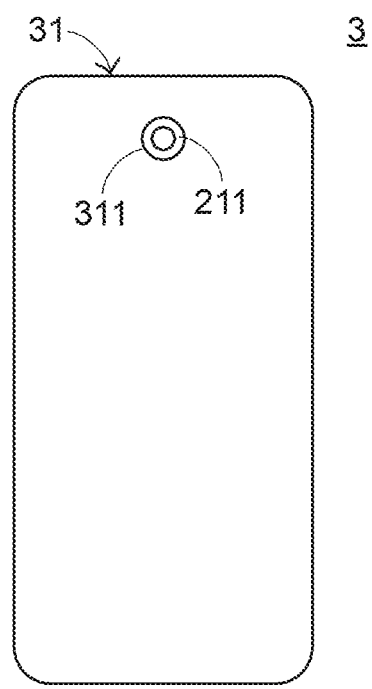
FIG. 6 is a schematic diagram of an outer structure in a preferred embodiment of an electronic device according to the present invention.
Figure 7:
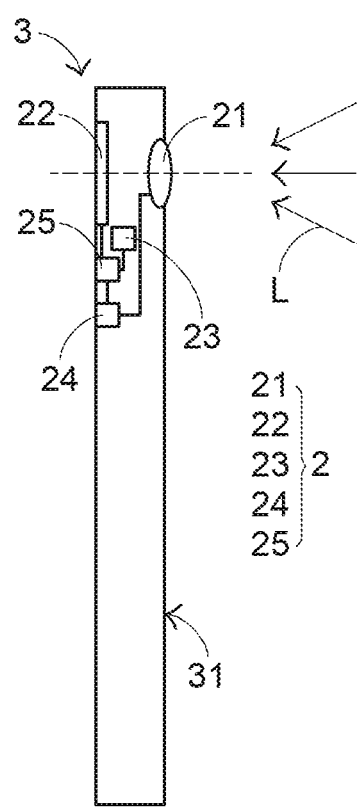
FIG. 7 is a side view of the electronic device shown in FIG. 6.

Referring to FIG. 6 and FIG. 7, FIG. 6 is a schematic diagram of an outer structure in a preferred embodiment of an electronic device according to the present invention; and FIG. 7 is a side view of the electronic device shown in FIG. 6. An electronic device 3 may be a mobile phone, a personal digital assistant, or a wearable device (a smart watch, a smart bracelet, or smart eyeglasses), and includes a housing 31 and an image capture device 2. Moreover, the housing 31 has a through hole 311 for an optical lens 211 of the image capture device 2 to be exposed outside. Therefore, a light beam L outside the housing 31 may be incident to the image capture device 2. The image capture device 2 of the electronic device 3 that is shown in FIG. 6 and FIG. 7 is substantially similar to that shown in FIG. 2, and details are not described herein again.

The foregoing is merely the preferred embodiments of the present invention, and is not intended to limit the scope of the present invention. Therefore, any other equivalent replacement or modification made without departing from the spirit disclosed by the present invention shall fall within the scope of the present invention.

What is claimed is:

1. An image focusing method, applied to an image capture device having an optical image stabilization (OIS) function, wherein when the image capture device is provided with the OIS function, at least one optical lens of the image capture device is configured to be driven to tilt, and the image focusing method comprises:

selecting a first target in a shot scene and a second target in the shot scene at a position different from that of the first target;

calculating an angle by which the at least one optical lens needs to be tilted according to the first target and the second target; and driving the at least one optical lens to tilt by the angle to enable both a first light beam group from the first target and a second light beam group from the second selected target to be focused on a same imaging surface after passing through the at least one tilted optical lens.

2. The image focusing method according to claim 1, wherein before the at least one optical lens tilts by the angle, the first light beam group from the first target is focused to the imaging surface after passing through the at least one optical lens, and the second light beam group from the second target is not focused to the imaging surface after passing through the at least one optical lens.

3. The image focusing method according to claim 1, further comprising:

driving, by using a motor, the at least one optical lens to tilt by the angle.

4. The image focusing method according to claim 1, wherein the motor is a voice coil motor.

5. An image capture device, comprising:

a motion sensing element;

at least one optical lens;

an image sensing element, comprising an imaging surface;

a processing unit connected to the image sensing unit and configured to calculate an angle by which the at least one optical lens needs to be tilted according to a first selected target in a shot scene and a second selected target in the shot scene at a position different from that of the first target; and a driving element, configured to drive, according to a sense result of the motion sensing element, the at least one optical lens to tilt, so as to provide an OIS function; wherein the driving element is connected to the processing unit and configured to drive the at least one optical lens to tilt by the angle to enable both a first light beam group from the first selected target and a second light beam group from the second selected target to be focused on the imaging surface after passing through the at least one tilted optical lens.

6. The image capture device according to claim 5, wherein before the driving element drives the at least one optical lens to tilt by the angle, the first light beam group from the first selected target is focused to the imaging surface after passing through the at least one optical lens, and the second light beam group from the second selected target is not focused to the imaging surface after passing through the at least one optical lens.

7. The image capture device according to claim 5, wherein the driving element is a motor.

8. The image capture device according to claim 7, wherein the motor is a voice coil motor.

9. An electronic device, comprising:

housing; and an image capture device, disposed in the housing, and comprising:

a motion sensing element;

at least one optical lens;

an image sensing element, comprising an imaging surface;

a processing unit connected to the image sensing unit and configured to calculate an angle by which the at least one optical lens needs to be tilted according to a first selected target in a shot scene and a second selected target in the shot scene at a position different from that of the first target; and a driving element, configured to drive, according to a sense result of the motion sensing element, the at least one optical lens to tilt, so as to provide an OIS function; wherein the driving element is connected to the processing unit and configured to drive the at least one optical lens to tilt by the angle to enable both a first light beam group from the first selected target and a second light beam group from the second selected target to be focused on the imaging surface after passing through the at least one tilted optical lens.

10. The image capture device according to claim 9, wherein before the driving element drives the at least one optical lens to tilt by the angle, the first light beam group from the first selected target is focused to the imaging surface after passing through the at least one optical lens, and the second light beam group from the second selected target is not focused to the imaging surface after passing through the at least one optical lens.

11. The image capture device according to claim 9, wherein the driving element is a motor.

12. The image capture device according to claim 11, wherein the motor is a voice coil motor.

13. The electronic device according to claim 9, wherein the electronic device is a mobile phone, a personal digital assistant, or a wearable device.

* * * * *